United States Patent
Ito et al.

(10) Patent No.: US 9,146,556 B2
(45) Date of Patent: Sep. 29, 2015

(54) PLANT MONITORING CONTROL SYSTEM

(75) Inventors: Toru Ito, Chiyoda-ku (JP); Yukiko Hirano, Chiyoda-ku (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 359 days.

(21) Appl. No.: 12/997,089

(22) PCT Filed: Aug. 6, 2008

(86) PCT No.: PCT/JP2008/064103
§ 371 (c)(1),
(2), (4) Date: Dec. 9, 2010

(87) PCT Pub. No.: WO2010/016113
PCT Pub. Date: Feb. 11, 2010

(65) Prior Publication Data
US 2011/0083092 A1    Apr. 7, 2011

(51) Int. Cl.
G05B 23/02    (2006.01)
*G05B 19/4063*    (2006.01)
G06Q 10/06    (2012.01)
G06F 3/0484    (2013.01)

(52) U.S. Cl.
CPC ........ *G05B 23/0267* (2013.01); *G05B 19/4063* (2013.01); *G05B 2219/36168* (2013.01); *G06F 3/0484* (2013.01); *G06F 3/04842* (2013.01); *G06F 3/04847* (2013.01); *G06Q 10/06* (2013.01)

(58) Field of Classification Search
CPC ... G06Q 10/06; G06F 3/0484; G06F 3/04842; G06F 3/04847

USPC ......................................................... 715/771
See application file for complete search history.

(56) References Cited

U.S. PATENT DOCUMENTS

| | | | |
|---|---|---|---|
| 4,833,592 A | 5/1989 | Yamanaka | |
| 4,992,866 A | 2/1991 | Morgan | |
| 5,777,896 A * | 7/1998 | Arita et al. | 702/185 |
| 7,103,444 B1 * | 9/2006 | Reitmeyer et al. | 700/180 |
| 2002/0046221 A1 * | 4/2002 | Louis Wallace et al. | 707/513 |
| 2002/0075244 A1 | 6/2002 | Tani et al. | |

(Continued)

FOREIGN PATENT DOCUMENTS

| | | |
|---|---|---|
| EP | 0 259 101 A2 | 3/1988 |
| JP | 5-250427 A | 9/1993 |

(Continued)

OTHER PUBLICATIONS

English Translation of JP06-139020.*

(Continued)

*Primary Examiner* — Tuyetlien Tran
(74) *Attorney, Agent, or Firm* — Buchanan Ingersoll & Rooney PC

(57) ABSTRACT

Without using any drawing command of a commercially available OS or library, screen information that will be screen elements has preliminarily been registered in a screen information database, and based on a touch position information detected by a touch position detecting section, a request control of a display screen or generation of a plant operation information is executed, as well as a registered screen information is fetched from the screen information database to generate a display screen and a process data of a plant that is linked to the display screen is read via a network.

4 Claims, 4 Drawing Sheets

(56) References Cited

U.S. PATENT DOCUMENTS

| | | | |
|---|---|---|---|
| 2003/0005486 A1* | 1/2003 | Ridolfo et al. | 800/288 |
| 2003/0061295 A1* | 3/2003 | Oberg et al. | 709/208 |
| 2004/0030429 A1* | 2/2004 | Baba et al. | 700/108 |
| 2004/0227739 A1* | 11/2004 | Tani et al. | 345/173 |
| 2006/0218266 A1* | 9/2006 | Matsumoto et al. | 709/224 |
| 2007/0172018 A1* | 7/2007 | Murayama et al. | 376/245 |
| 2008/0154399 A1* | 6/2008 | Kaneko et al. | 700/90 |

FOREIGN PATENT DOCUMENTS

| | | | | |
|---|---|---|---|---|
| JP | 6-139020 A | | 5/1994 | |
| JP | 7-261833 A | | 10/1995 | |
| JP | 08076832 A | * | 3/1996 | G05B 23/02 |
| JP | 9-212231 A | | 8/1997 | |
| JP | 10-268930 A | | 10/1998 | |
| JP | 2000-148236 A | | 5/2000 | |
| JP | 2000-305607 A | | 11/2000 | |
| JP | 2003-233413 A | | 8/2003 | |
| JP | 2004-030345 A | | 1/2004 | |
| JP | 2005-316778 A | | 11/2005 | |
| JP | 2007-140722 A | | 6/2007 | |

OTHER PUBLICATIONS

English Translation of JPH12-148236.*
International Search Report (PCT/ISA/210) issued on Oct. 28, 2008, by Japanese Patent Office as the International Searching Authority for International Application No. PCT/JP2008/064103.
Written Opinion (PCT/ISA/237) issued on Oct. 28, 2008, by Japanese Patent Office as the International Searching Authority for International Application No. PCT/JP2008/064103.
Search Report from European Patent Office dated Jan. 15, 2013, issued in corresponding European Patent Application No. 08808715.0.
Office Action from European Patent Office dated Feb. 3, 2014, issued in corresponding European Patent Application No. 08808715.0. (5 pages).
Office Action from European Patent Office dated Jul. 2, 2014, issued in corresponding European Patent Application No. 08808715.0. (5 pages).
Office Action (Notification of the Reasons for Refusal) dated Mar. 13, 2012, issued in the corresponding Japanese Patent Application No. 2010-523672, and an English Translation thereof. (6 pages).

* cited by examiner

--PRIOR ART--

PLANT MONITORING CONTROL SYSTEM

TECHNICAL FIELD

The present invention relates to a plant monitoring control system for monitoring and controlling the operation of power plants, industrial and chemical plants or the like and, in particular, to a plant monitoring control system enabling to monitor or control a plant to be operated using a touch panel detector.

BACKGROUND ART

FIG. 4 is a diagram illustrating an example of arrangement of a conventional display control unit (plant monitoring control system) that enables the monitoring and control operation of a plant using a touch panel.

The conventional display control unit illustrated in FIG. 4 is the one disclosed in the Japanese Patent Publication (unexamined) No. 139020/1994 (Patent Document 1), the display control unit including a control unit 47 acting to control various control equipments (plant equipments) for use in power plants, industrial or chemical plants or the like, as well as comprising a display 41 displaying the state of the plant equipments, a touch panel detector 42 to be added to an operation control screen, being a display screen of the display 41, and a display computer 46 acting to control the display 41 based on the output from the touch panel detector 42 and the output from the control unit 47, and in this display control unit there is provided a touch panel detector control section 43 acting to possess a database outputting a control signal that shows which position of the touch panel detector 42 corresponds to which positional information of, e.g., various control equipments being displayed on the display 41 so as to output a control signal to the control unit 47 based on the touch position of the touch panel.

In the conventional display control unit illustrated in FIG. 4, a plant operator (operator), while looking at an operation control screen displayed on the display 41 by the display computer 46, touches a predetermined position of the touch panel detector 42 to make an operation.

The touch panel detector control section 43 inputs "touch position information (actually, coordinate position data) that the plant operator touches" from the touch panel detector 42 and "operation screen information that is currently displayed on the display 41".

Subsequently, based on such information, the control signal corresponding to such information is searched with the use of stored database to be outputted to the control unit 47. The control unit 47, based on this control signal, controls a variety of control equipments of the plant.

In this manner, due to that the output processing (instruction of operation control) of a control signal with respect to a control unit conventionally conducted by a display computer is conducted at the touch panel detector control unit 43, the load on the display computer can be reduced.

Furthermore, the above-mentioned Japanese Patent Publication (unexamined) No. 139020/1996 discloses also an arrangement in which a plurality of systems each being made up of the above-mentioned display 41, touch panel detector 42, touch panel detector control unit 43 and display computer 46 are provided, and each touch panel detector control unit 43 and each display computer 46 of each system make an output to the control unit 47 via a control signal information network 48, as well as each display computer 46 of each system makes an output to the control unit 47 via a communication network 48.

Owing to such arrangement, this display control unit is applicable to a large-scale system requiring a plurality of displays.

Patent Document 1: Japanese Patent Publication (unexamined) No. 139020/1996 (FIG. 1, paragraph 0008)

DISCLOSURE OF INVENTION

Problems to be Solved by the Invention

Although the conventional display control unit (monitoring control system) of a plant as is described in the Japanese Patent Publication (unexamined) No. 139020/1996 uses database for detecting a touch position of the touch panel, many drawing processing programs of a display screen employ a program using drawing-only command that depends on a commercially available operation system (OS) or library. Consequently, operations of confirming a program and alternating a program need to be conducted every time OS or library is changed.

Particularly in case of a control unit of which software is required to be of high quality, as in a large-scale power plant control unit, when its program is changed, software verification is essential to verify whether or not there is any erroneous description in the program. In the conventional drawing program in which screen elements of a display screen are newly written, however, there are large amounts of programs, and thus the software verification thereof requires much manpower.

The present invention was made to solve the above-described problems and has an object of providing a plant monitoring control system with which by no use of drawing-only command of a commercially available OS (operating system) or program library, higher usability/cost performance of screen display software can be obtained at the time of OS version up and at the time of model change of a control unit as well as more easy software verification of drawing program can be achieved.

Means of Solution to the Problems

A plant monitoring control system according to present invention includes:

a VDU terminal displaying an operating state and process amount information of a plant as a monitoring control screen;

a touch position detecting section detecting a touch position on a display screen using a touch panel located in opposition to the display screen of the mentioned VDU terminal; and a plant monitoring control unit comprising: a screen information database in which database of screen display information of a monitoring control screen to be displayed on the mentioned display screen of the mentioned VDU terminal has preliminarily been registered; a screen display module making a drawing processing for displaying an operating state and process amount information of a plant on the mentioned display screen of the mentioned VDU terminal; and an operation signal generation module generating an operation signal of a plant using a screen information having preliminarily been registered in the mentioned screen information database and a touch position information to be detected by the mentioned touch position detecting section;

in which based on the touch position information detected by the mentioned touch position detecting section, a request control of the mentioned display screen or generation of a plant operation information is executed, as well as a registered screen information is fetched from the mentioned screen information database to generate a display screen, and a process data of a plant that is linked to the mentioned display screen is read via a network.

Effect of the Invention

In the plant monitoring control system according to the invention, based on touch position information detected by the touch position detecting section, request control of the display screen or generation of a plant operation information is executed, as well as a screen information having preliminarily been registered is fetched from the screen information database to generate a display screen.

Consequently, due to that no drawing-only command of a commercially available OS or program library is used in the invention, it is possible to obtain higher usability/cost performance of screen display software at the time of OS version up and at the time of model change of a control unit as well as to achieve more easy software verification of drawing program.

EXPLANATION OF REFERENCE NUMERALS

Figure 1:
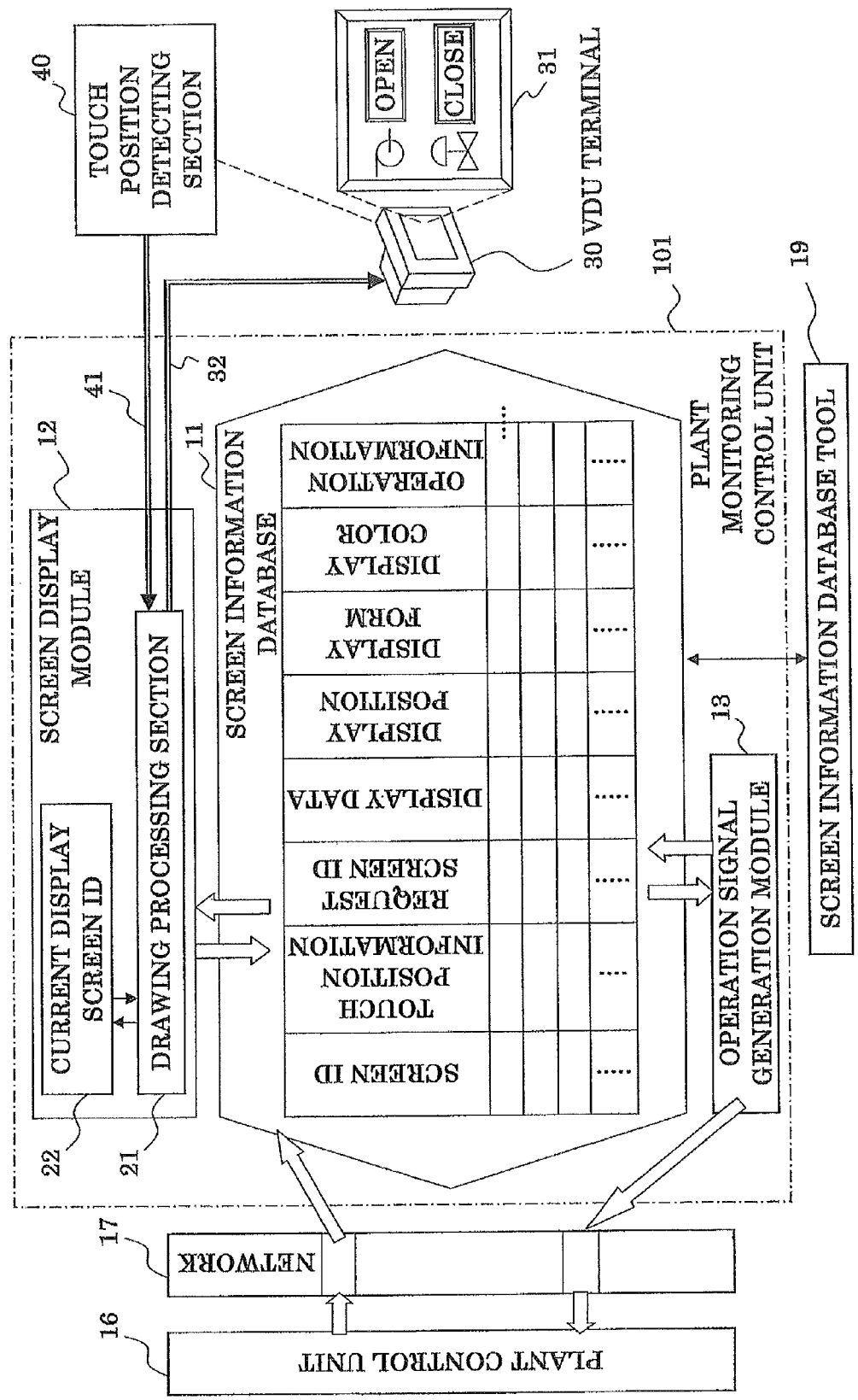
FIG. 1 is a diagram illustrating an arrangement of a plant monitoring control system according to a first preferred embodiment.

11: Screen information database, 12: Screen display module, 13: Operation signal generation module, 16: Plant control unit, 17: Network, 19: Screen information database tool, 21: Drawing processing section, 31: VDU terminal, 31: Display screen, 32: Image display signal, 40: Touch position detecting section, 41: Touch position information, 50: Another plant control unit, 51: Request screen ID,
101, 102: Plant monitoring control unit
Best Mode for Carrying Out the Invention Hereinafter, a preferred embodiment of the present invention is described referring to the drawings.

Incidentally, the same reference numerals are designated to the same or like parts.
Embodiment 1

FIG. 1 is a diagram illustrating an arrangement of a plant monitoring control system according to a first embodiment.

In FIG. 1, reference numeral 30 designates a VDU (Visual Display Unit) terminal acting as a man-machine interface. On the display screen 31 of this VDU terminal 30, a "monitoring screen" displaying the operating state or the process amount of plant equipment (not illustrated) and a "control screen" for operating the plant equipment are displayed.

Furthermore, on the display screen 31 of the VDU terminal 30, the content of a screen information database that is registered in the below-described plant monitoring control unit can also be selected and displayed. Incidentally, in FIG. 1, the display screen 31 shows the case that the monitoring screen is displayed on the left side and the control screen is displayed on the right side.

In addition, at the display surface (display screen 31) of the VDU terminal 30, there is located (added) a touch position detecting section (that is, a touch panel) acting to detect a touched position on the screen by the block of infrared rays or the change of capacitance.

In FIG. 1, numeral 101 designates a plant monitoring control unit in this embodiment.

The plant monitoring control unit 101 is made up of a screen information database 11, a screen display module 12 making a screen display processing for displaying the state of a plant installation, and an operation signal generation module 13.

In the screen information database 11, database of screen display information such as screen ID, touch position information, request screen ID, display data, display position, display form, display color and operation information has preliminarily been registered.

The screen display module 12 acts to make a screen display processing for displaying the operating state (operation state) or the process amount of plant equipment on the display screen 31 of the VDU terminal 30, and is made up of a drawing processing section 21 making a drawing processing based on the current display screen ID 22.

The operation signal generation module 13 generates an operation signal using screen information registered in the screen information database 11 and touch position information 41 generated at the touch position detecting section 40, and transmits information (operation signal) to a plant control unit 16 acting to control a plant installation via a plant network 17.

The plant control unit 16 controls the operation of plant equipment based on the information (operation signal) having been transmitted from the operation signal generation module 13.

Touch position information is inputted to the drawing processing section 21 of the screen display module 12 from the touch position detecting section (touch panel) 40, and an image display signal 32 having been generated is inputted from the drawing processing section 21 to the VDU terminal 30.

Besides, to collect the operating state and process amount information of plant installation, the screen display module 12 of the plant monitoring control unit 101, periodically writes via the network 17 the operation information or process information of plant equipment (for example, information from a sensor such as pressure, water level or open or closed state of valve) that the plant monitoring control unit 101 has collected from the plant equipment.

Further, the plant monitoring control unit 101, from these written information, reads a process data necessary for screen display at the screen display module 12.

The plant monitoring control system according to this embodiment includes the touch position detecting section 40 that receives a plant operation input or a request input for monitoring screen changeover from an operator and generates touch position information. The touch position information generated by the touch position detecting section 40 is inputted to the screen display module 12 of the plant monitoring control unit 101.

Furthermore, the plant monitoring control unit 101 is provided with the operation signal generation module 13 for generating a command signal of operating the plant equipment.

Besides, by the connection of a screen database tool (that is, a tool for creating, and altering and modifying a screen element data for use in screen display) 19 to the plant monitoring control unit 101, the screen information database 11 of the plant monitoring control unit 101 can make edit (that is, new creation, or alternation or modification of a screen element data) without alternation of a program of the plant monitoring control unit 101 (that is, without alternation of the screen display module 11 and the operation signal generation module 13).

That is, even if any model change of the plant monitoring control unit 101 takes place, the model change can be conducted efficiently as well as with high quality without change of program.

Figure 2:
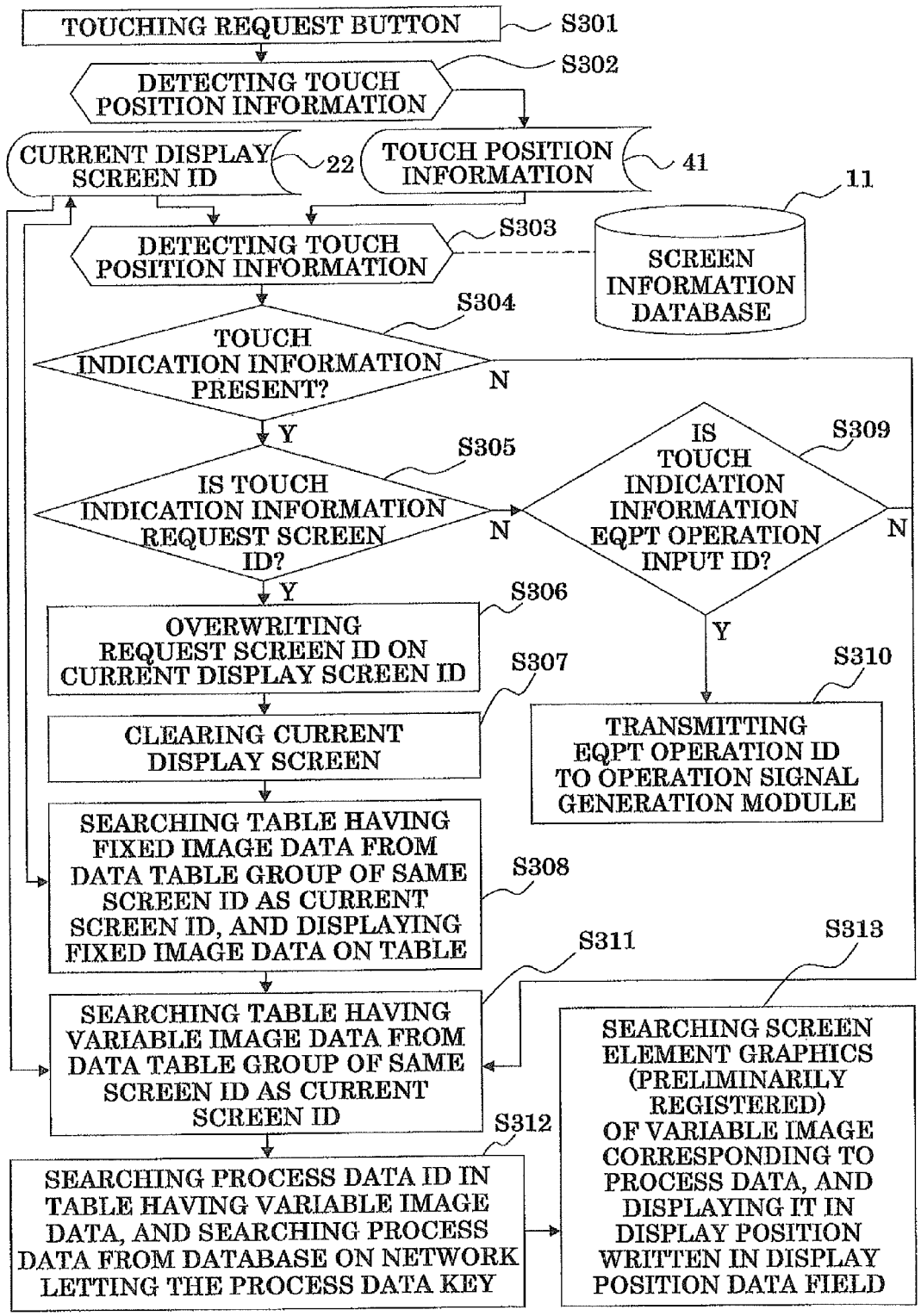
FIG. 2 is a flowchart showing a processing content of a screen display module in the first embodiment.

FIG. 2 is a flowchart for explaining the processing content of a screen display module in this embodiment.

With reference to FIG. 2, an example of processing based on a screen display request is now described.

The display screen in the invention includes a request touch area for executing the changeover of a displayed screen to request the display of another screen.

The processing flow of making such a request operation as to execute the changeover from the screen in current display to another screen is hereinafter described.

First, an operator touches a request button on the display screen currently displayed. (Step S301)

The touch position detecting section (touch panel) has a function of detecting the touch position information on the VDU terminal 30 that the operator has touched, and thus touch position information (touch coordinates) 41 is detected by the touch position detecting section 40 and stored. (Step S302)

The drawing processing section 21 of the screen display module 12 illustrated in FIG. 1 periodically operates, and first, fetches the touch position information and the current display screen information and starts the search of the screen information database letting the screen ID currently displayed (current display screen ID) a key. (Step S303)

By the processing in Step S303, the data table in which the screen ID 22 currently displayed is included is extracted from the screen information database 11, and it is confirmed whether or not the position of coordinates having been touch-inputted is present in the data range of the touch position information in the data table. (Step S304)

When the touch position information (that is, the position of coordinates having been touch-input) is present, it is then confirmed whether or not data is stored in the attributes of the request screen ID in this table. (Step S305)

When the request screen ID is present, the drawing processing section 21 updates (overwrites) the data of the current display screen ID 22 with the data of the request screen ID (Step S306), as well as erases (clears) the current display screen (Step S307) and displays a fixed image portion of the updated display screen ID. (Step S308)

That is, in Step S308, the table having a fixed image data is searched from the data table group having the same screen ID as that of the current display screen ID, and the fixed image data on the table is displayed.

In addition, in Step S308, the display screen ID data is collated and searched letting the current display screen ID having been updated from the screen information database 11 a key, and the display data (plant process ID data), display position and display form (symbol display, numerical value display and the like) of the same table are fetched.

The drawing processing section 21 of the screen display module 12 fetches plant process information (numerical value, ON/OFF state and the like) on the network 17 letting the display data a key, and makes a drawing processing with the use of data of the searched display position, the searched display form (numerical value display or symbol display) and the like.

In Step S305, when the request ID is absent in the table of which data is coincident with the touch position information (that is, when the touch position information is not the request screen ID), the operation information ID is surely searched in the table. (Step S309)

In Step S309, operation information is searched in the data table as well as the operation signal generation module 13 is started, and the operation information is transmitted to this operation signal generation module 13. (Step S310)

In the unlikely event that the operation information ID is not described in the data table, no request processing is made and variable image update processing is executed. (Step S311)

In the variable image update processing in Step S311, to display the up-to-date state of a plant process data, the current display screen ID 22 is fetched, and from the data table having been searched with the display screen ID 22, the table in which a variable image is included is further selected.

The process ID in the table where the variable image data is described is searched, and the process data is searched from database on the network letting the process data ID a key. (Step S312)

Subsequently, the screen element graphics (the one having preliminarily been registered in the database) of the variable image corresponding to the process data is searched, and the variable image graphics is overwritten at a position of the data of the display position information that is described on the same table, whereby the variable image data in the display screen is updated. (Step S313)

In this manner, in this embodiment, display graphics corresponding to display screen elements (fixed image frame and the like) has preliminarily been registered in the screen information database 11.

Furthermore, screen element data to be in the display screen 31 has preliminarily been registered in the screen information database 11 as well.

In the drawing program at the time of execution of screen changeover display after the request processing, screen elements corresponding to a request display screen identification number are searched from the screen information database 11, and graphics corresponding to the searched screen elements is fetched from the screen information database 11 to be displayed, thereby enabling to execute screen display without using any drawing command that is much likely to depend on OS or library.

As described above, the plant monitoring control system according to this embodiment includes:

a VDU terminal 30 displaying an operating state and process amount information of a plant as a monitoring control screen;

a touch position detecting section 40 detecting a touch position on a display screen 31 using a touch panel located in opposition to the display screen 31 of the VDU terminal 30; and a plant monitoring control unit 101 comprising: a screen information database 11 in which database of screen display information (for example, a screen ID, touch position information, request screen ID, display data, display position, display form, display color, operation information and the like) of a monitoring control screen to be displayed on the display screen 31 of the VDU terminal 30 has preliminarily been registered; a screen display module 12 making a drawing processing for displaying an operating state and process amount information of a plant on the display screen 31 of the VDU terminal 30; and an operation signal generation module 13 generating an operation signal of a plant using a screen information having preliminarily been registered in the screen information database 11 and a touch position information 41 to be detected by the touch position detecting section 40;

in which based on the touch position information 41 detected by the touch position detecting section 40, a request control of the display screen 31 or generation of a plant operation information is executed, as well as a registered screen information is fetched from the screen information database 11 to generate a display screen and a process data of a plant that is linked to the display screen 31 is read via a network 17.

Besides, in the plant monitoring control system according to this embodiment, in the case that a touch position information detected by the touch position detecting section 40 specifies any operation command of a plant, a screen operation information is generated at the operation signal generation module 13 using the screen information database 11, and an operation command is transmitted to the plant monitoring control unit 101 via the network 17.

Furthermore, in the screen information database 11, screen elements to make up a display screen and graphics of the screen elements have preliminarily been registered.

In addition, to the screen information database 11, a screen database tool acting to edit registered database can be connected.

Embodiment 2

Figure 3:
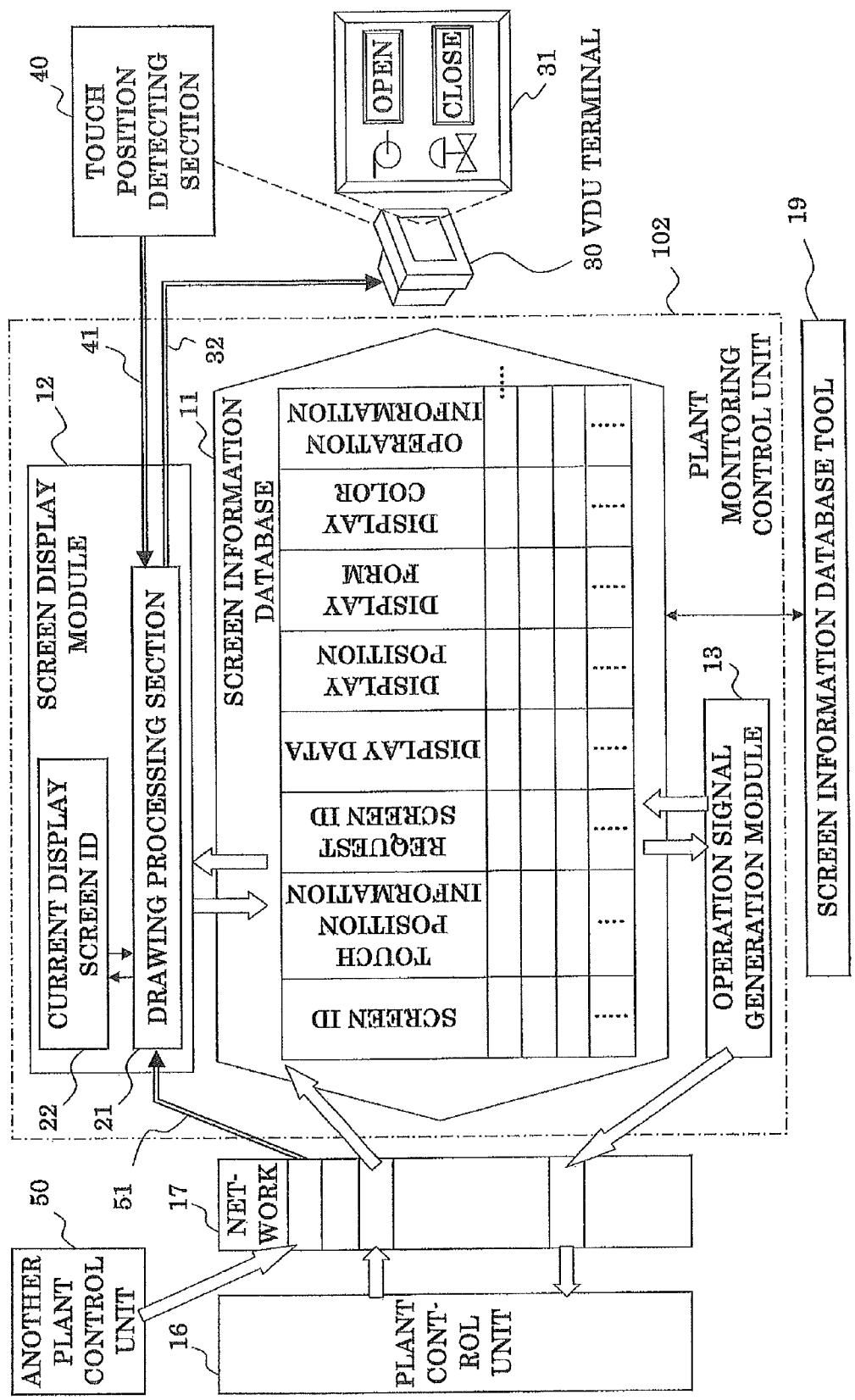
FIG. 3 is a diagram illustrating an arrangement of a plant monitoring control system according to a second embodiment.
Figure 4:
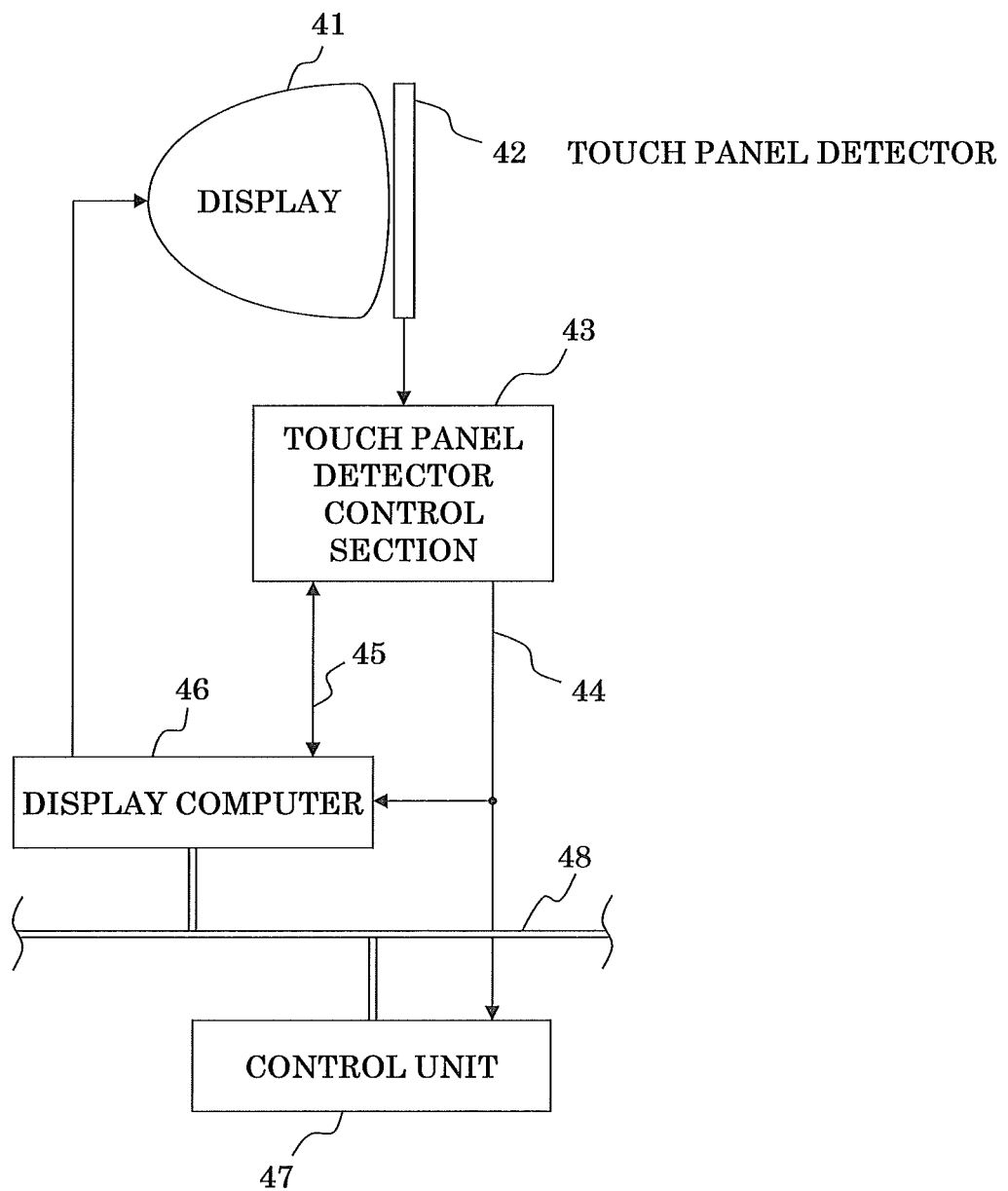
FIG. 4 is a diagram illustrating an example of an arrangement of a conventional display control unit.

FIG. 3 is a diagram illustrating an arrangement of a plant monitoring control system according to a second embodiment.

In the above-described first embodiment, described is the case of making a display screen request from a touch input (that is, touch position information from the touch position detecting section) directly connected to the plant monitoring control unit 101. On the other hand, in this embodiment, as is illustrated in FIG. 3, another plant control unit 50 is further connected to a plant monitoring control unit 102 via the network 17, and a screen request can be made from another connected plant control unit 50.

Incidentally, reference numeral 51 designates a request screen ID to be inputted to the screen display module 12.

In this embodiment, the screen display module 12 fetches a request screen ID from, for example, another plant control unit 50 via the network 17, and in this area (that is, the area of the request screen ID), the pertinent plant monitoring control unit 102 monitors the presence or absence of data in each operation cycle.

Then, when data is present and the data is the request screen ID, this request screen ID is fetched from on the network 17, the processing in Step S306 of the processing flow shown in FIG. 2 is started and a display screen is changed over to display a control screen.

Such a screen request function from another display control unit 50 enables to make a display on the display screen 31 of the VDU terminal 31 of the pertinent control unit without changeover of the screen of another display control unit 50. Consequently, an efficient operation can be achieved without interruption of monitoring due to changeover of screen.

In addition, a monitoring operation with less human errors can be achieved without interruption of a continuous monitoring due to changeover of screen.

As has been described above, in the plant monitoring control system according to this embodiment, in the case of presence of a request for an operation screen from another plant control unit 50 connected via the network 17, request information is fetched via the network 17 and the operation screen corresponding to the request is displayed on the display screen 31.

INDUSTRIAL APPLICABILITY

The present invention is useful in obtaining a plant monitoring control system enabling to obtain higher usability/cost performance of a screen display software at the time of OS version up and at the time of the model change of a control unit as well as to achieve more easy software verification of drawing program.

The invention claimed is:

1. A plant monitoring control system comprising:
a visual display unit (VDU) terminal displaying an operating state and process amount information of a plant as a monitoring control screen;
a touch position detecting section detecting a touch position on a display screen using a touch panel located in opposition to said display screen of said VDU terminal;
a plant monitoring control unit including a screen information database in which a database of screen display information of a monitoring control screen to be displayed on said display screen of said VDU terminal has preliminarily been registered, wherein the plant monitoring control unit is configured to
perform a drawing process for displaying an operating state and process amount information of a plant on said display screen of said VDU terminal,
generate an operation signal of a plant using a screen information having preliminarily been registered in said screen information database and touch position information to be detected by said plant monitoring control unit,
edit the registered screen display information,
execute a request control of said display screen or generation of a plant operation information based on touch position information detected by said plant monitoring control unit,
fetch a registered screen information from said screen information database to generate a display screen, and
read a process data of a plant that is linked to said touch position information display screen via a network.

2. The plant monitoring control system according to claim 1, wherein in said screen information database, screen elements to make up a display screen and graphics of said screen elements have preliminarily been registered.

3. The plant monitoring control system according to claim 1, wherein in the case of the presence of a request of an operation screen from another plant control unit in connection via a network, request information is fetched via said network and an operation screen based on the request is displayed on said display screen.

4. The plant monitoring control system according to claim 1, wherein in the case that a touch position information detected by said plant monitoring control unit specifies an operation command of a plant, a screen operation information is generated at the plant monitoring control unit using said screen information database, and an operation command is transmitted to said plant monitoring control unit via said network.

* * * * *